US012591948B2

(12) United States Patent
Heo et al.

(10) Patent No.: US 12,591,948 B2
(45) Date of Patent: Mar. 31, 2026

(54) METHOD AND APPARATUS WITH IMAGE DISPLAY

(71) Applicant: Samsung Electronics Co., Ltd., Suwon-si (KR)

(72) Inventors: Jingu Heo, Yongin-si (KR); Dong Kyung Nam, Yongin-si (KR); Juyong Park, Seongnam-si (KR); Sung Kwang Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 853 days.

(21) Appl. No.: 17/584,662

(22) Filed: Jan. 26, 2022

(65) Prior Publication Data

US 2022/0366531 A1     Nov. 17, 2022

(30) Foreign Application Priority Data

May 14, 2021     (KR) ......................... 10-2021-0062932

(51) Int. Cl.
*G06T 3/4038* (2024.01)
*G06T 3/18* (2024.01)
*G06T 5/50* (2006.01)

(52) U.S. Cl.
CPC .............. *G06T 3/4038* (2013.01); *G06T 3/18* (2024.01); *G06T 5/50* (2013.01)

(58) Field of Classification Search
CPC ........... G06T 3/4038; G06T 3/18; G06T 5/00; G06T 5/50; G06T 7/33; G06T 3/40; H04N 5/265; H04N 23/81
See application file for complete search history.

(56) References Cited

U.S. PATENT DOCUMENTS

| | | | |
|---|---|---|---|
| 7,646,404 B2 | 1/2010 | Liu et al. | |
| 7,961,936 B2 * | 6/2011 | Liang ........................ | G06T 7/85 |
| | | | 382/294 |
| 8,345,961 B2 | 1/2013 | Li et al. | |
| 10,469,759 B2 | 11/2019 | Ardo et al. | |
| 10,498,968 B1 * | 12/2019 | Gupta .................. | H04N 23/611 |
| 10,616,483 B1 * | 4/2020 | Ngai ..................... | G06T 19/003 |

(Continued)

FOREIGN PATENT DOCUMENTS

| | | |
|---|---|---|
| CN | 106067941 A | 11/2016 |
| CN | 110782395 A | 2/2020 |

(Continued)

OTHER PUBLICATIONS

Philip, Sujin, et al. "Distributed Seams for Gigapixel Panoramas." *IEEE Transactions on Visualization and Computer Graphics* vol. 21 Issue 3, 2014 (13 pages in English).

*Primary Examiner* — Charles T Shedrick
(74) *Attorney, Agent, or Firm* — NSIP Law

(57) ABSTRACT

A processor-implemented imaging method includes: obtaining initial homography information between a plurality of tele images that covers a field of view (FOV) of a wide image; receiving a user input of zooming a partial region of the wide image from a screen on which the wide image is displayed; stitching tele images corresponding to the partial region using the initial homography information, based on whether a zoom level corresponding to the user input exceeds a maximum zoom level of the wide image; and rendering the stitched tele images and displaying an image obtained by the rendering on the screen.

16 Claims, 10 Drawing Sheets

(56) References Cited

U.S. PATENT DOCUMENTS

| | | | |
|---|---|---|---|
| 10,630,899 B2 | 4/2020 | Chuang et al. | |
| 10,645,286 B2 | 5/2020 | Fridman et al. | |
| 10,803,551 B2 | 10/2020 | Gubbi Lakshminarasimha et al. | |
| 11,792,538 B2 * | 10/2023 | Venkataraman | H04N 5/265 348/222.1 |
| 2007/0188653 A1 * | 8/2007 | Pollock | H04N 23/683 348/E5.025 |
| 2009/0022422 A1 * | 1/2009 | Sorek | H04N 1/3876 382/284 |
| 2010/0302280 A1 * | 12/2010 | Szeliski | G06T 7/33 345/660 |
| 2012/0033030 A1 * | 2/2012 | Liu | H04N 7/15 348/E7.083 |
| 2013/0293671 A1 * | 11/2013 | Gorstan | G06T 3/4038 348/36 |
| 2015/0143421 A1 * | 5/2015 | Williams | H04N 21/64322 725/38 |
| 2015/0229848 A1 * | 8/2015 | Aggarwal | H04N 5/272 348/240.2 |
| 2015/0296149 A1 * | 10/2015 | Laroia | H04N 23/57 348/239 |
| 2017/0230585 A1 * | 8/2017 | Nash | H04N 23/69 |
| 2018/0352165 A1 * | 12/2018 | Zhen | H04N 23/67 |
| 2019/0272619 A1 * | 9/2019 | Lim | H04N 23/698 |
| 2019/0318538 A1 * | 10/2019 | Li | G06T 19/20 |
| 2022/0245890 A1 * | 8/2022 | Fialko | G01B 11/24 |

FOREIGN PATENT DOCUMENTS

| | | | | |
|---|---|---|---|---|
| JP | 2006-238325 A | 9/2006 | | |
| JP | 4653041 B2 | 3/2011 | | |
| KR | 10-1012075 B1 | 2/2011 | | |
| KR | 10-1975472 B1 | 5/2019 | | |
| WO | WO-0109836 A1 * | 2/2001 | | G06T 3/40 |

* cited by examiner

1000

METHOD AND APPARATUS WITH IMAGE DISPLAY

CROSS-REFERENCE TO RELATED APPLICATIONS

This application claims the benefit under 35 USC § 119(a) of Korean Patent Application No. 10-2021-0062932 filed on May 14, 2021, in the Korean Intellectual Property Office, the entire disclosures of which are incorporated herein by reference for all purposes.

BACKGROUND

1. Field

The following description relates to a method and apparatus with image display.

2. Description of Related Art

A panorama technology may refer to a technology for stitching a plurality of images with a narrow field of view (FOV) into a single wide image with a wide FOV. A panorama function of the panorama technology may be provided in mobile terminals, general cameras, and the like. Image stitching, a technique of image registration used for the panorama technology, may have limitations (for example, restricting a movement in a certain direction (for example, a horizontal direction) or restricting memory usage) in order to be provided in a mobile terminal.

For example, in the case of restoring an ultra-high-pixel image (for example, a gigapixel image) through image stitching, homography estimation may be unstable in an image capturing environment in which available features the image are limited, and stability may be degraded in a process of feature matching when there are many duplicate patterns. In addition, image stitching may need numerous pixel-wise operations processed in a memory, and thus may decrease an image processing speed or rapidly increase memory usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented imaging method includes: obtaining initial homography information between a plurality of tele images that covers a field of view (FOV) of a wide image; receiving a user input of zooming a partial region of the wide image from a screen on which the wide image is displayed; stitching tele images corresponding to the partial region using the initial homography information, based on whether a zoom level corresponding to the user input exceeds a maximum zoom level of the wide image; and rendering the stitched tele images and displaying an image obtained by the rendering on the screen.

The stitching may include: determining whether the zoom level corresponding to the user input exceeds the maximum zoom level; in response to the zoom level exceeding the maximum zoom level, determining whether the number of the tele images corresponding to the partial region is multiple; and in response to the number of the tele images corresponding to the partial region being multiple, stitching the multiple tele images corresponding to the partial region based on the initial homography information.

The stitching in response to the number of the tele images corresponding to the partial region being multiple may include: aligning the multiple tele images corresponding to the partial region based on the initial homography information; selecting a boundary line candidate from among a plurality of boundary line candidates preset in an overlapping region of the aligned tele images; and removing an artifact occurring by the selected boundary line candidate.

The selecting of the boundary line candidate may include determining the boundary line candidate based on pixel values of pixels of lines corresponding to the boundary line candidates.

The selecting of the boundary line candidate may include determining the boundary line candidate based on a result of accumulating, for each of the boundary line candidates, differences of pixels values of pixels in a boundary region adjacent to the boundary line candidate.

The removing of the artifact may include: determining a deformation field of a boundary region of the tele images based on an optical flow of the boundary region comprising the selected boundary line candidate; and warping pixels in the boundary region based on the deformation field.

The stitching in response to the number of the tele images corresponding to the partial region being multiple may include: scaling the multiple tele images corresponding to the partial region according to a current scale corresponding to the user input, based on the initial homography information; and stitching the scaled tele images.

The determining whether the number of the tele images corresponding to the partial region is multiple may include determining whether the number of the tele images corresponding to the partial region is multiple based on tiling information of the tele images corresponding to the partial region.

The method may include, in response to the number of the tele images corresponding to the partial region not being multiple, rendering a tele image corresponding to the partial region and displaying an image obtained by the rendering.

The method may include rendering the wide image according to an environment of a display device and displaying an image obtained by the rendering on the screen.

In another general aspect, one or more embodiments include a non-transitory computer-readable storage medium storing instructions that, when executed by a processor, configure the processor to perform any one, any combination, or all operations and methods described herein.

In another general aspect, a processor-implemented imaging method includes: obtaining a wide image, a plurality of tele images that cover a field of view (FOV) of the wide image, and initial homography information between the tele images; receiving a user input of zooming a partial region of the wide image from a screen of a display on which the wide image is displayed; in response to a zoom level corresponding to the user input not exceeding a maximum zoom level of the wide image, rendering a wide image scaled according to a scale corresponding to the user input and displaying an image obtained by the rendering on the screen; in response to the zoom level corresponding to the user input exceeding the maximum zoom level of the wide image, scaling tele images corresponding to the partial region according to the scale corresponding to the user input and aligning the scaled tele images, based on the initial homography information; removing an artifact occurring by a boundary line candidate selected from among a plurality of boundary line candidates preset in an overlapping region of the aligned tele images;

and rendering tele image from which the artifact is removed and displaying an image obtained by the rendering on the screen.

In another general aspect, an imaging apparatus includes: a camera module configured to obtain a wide image, a plurality of tele images that covers a field of view (FOV) of the wide image, and initial homography information between the tele images; a display device configured to display at least one of the wide image and the tele images; a user interface (UI) configured to receive a user input of zooming a partial region of the wide image from a screen of the display device on which the wide image is displayed; and a processor configured to stitch tele images corresponding to the partial region using the initial homography information based on whether a zoom level corresponding to the user input exceeds a maximum zoom level of the wide image, render the stitched tele images, and display an image obtained by the rendering.

For the stitching, the processor may be configured to: determine whether the zoom corresponding to the user input exceeds the maximum zoom level; determine whether the number of the tele images corresponding to the partial region is multiple in response to the zoom exceeding the maximum zoom level; and stitch the multiple tele images corresponding to the partial region based on the initial homography information in response to the number of the tele images corresponding to the partial region being multiple.

For the stitching in response to the number of the tele images corresponding to the partial region being multiple, the processor may be configured to: align the multiple tele images corresponding to the partial region based on the initial homography information; select a boundary line candidate from among a plurality of boundary line candidates preset in an overlapping region of the aligned tele images; and remove an artifact occurring by the selected boundary line candidate.

For the selecting of the boundary line candidate, the processor may be configured to determine the boundary line candidate based on pixel values of pixels of lines corresponding to the boundary line candidates.

For the selecting of the boundary line candidate, the processor may be configured to determine the boundary line candidate based on a result of accumulating, for each of the boundary line candidates, differences of pixels values of pixels in a boundary region adjacent to the boundary line candidate.

For the removing of the artifact, the processor may be configured to: determine a deformation field of a boundary region of the tele images by an optical flow of the boundary region comprising the selected boundary line candidate; and warp pixels in the boundary region based on the deformation field.

For the stitching in response to the number of the tele images corresponding to the partial region being multiple, the processor may be configured to: scale the multiple tele images corresponding to the partial region according to a current scale corresponding to the user input, based on the initial homography information; and stitch the scaled tele images.

For the determining whether the number of the tele images corresponding to the partial region is multiple, the processor may be configured to determine whether the number of the tele images corresponding to the partial region is multiple based on tiling information of the tele images corresponding to the partial region.

In another general aspect, a processor-implemented imaging method includes: obtaining a wide image and a plurality of tele images that corresponds to a field of view (FOV) of the wide image; determining tele images among the plurality of tele images that correspond to a partial region of the wide image based on tiling information of the plurality of tele images, in response to a zoom level of an input corresponding to the partial region exceeding a predetermined zoom level of the wide image; and stitching the determined tele images and rendering the stitched tele images.

The stitching may include excluding tele images not determined to correspond to the partial region from the stitching.

A FOV of each of the tele images may be narrower than the FOV of the wide image, and a predetermined zoom level of each of the tele images may be greater than the predetermined zoom level of the wide image.

The input may be a user input of zooming the partial region of the wide image from a screen on which the wide image is displayed.

Other features and aspects will be apparent from the following detailed description, the drawings, and the claims.

Figure 1:
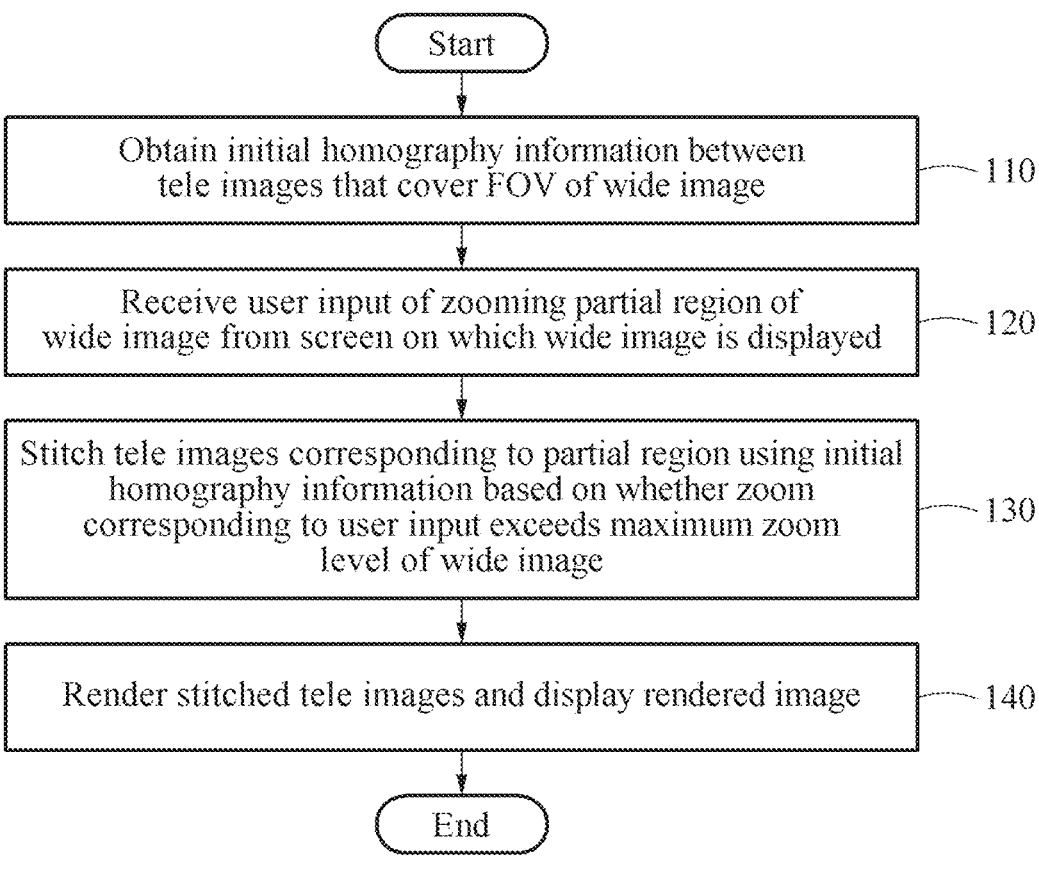
FIG. 1 illustrates an example of an image displaying method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an image displaying method. The operations to be described hereinafter may be performed in sequential order, but not necessarily be performed in sequential order. For example, the order of the operations may change, and at least two of the operations may be performed in parallel.

An image displaying apparatus of one or more embodiments, which is an apparatus for displaying an image, may display an image by performing operations 110 through 140 to be described hereinafter with reference to FIG. 1. The image displaying apparatus may be or include any of a smartphone, a personal computer (PC), a laptop computer, a tablet PC, a television (TV), a smart home appliance, an intelligent vehicle, a kiosk, and a wearable device, as non-limiting examples.

In operation 110, the image displaying apparatus may obtain initial homography information between a plurality of tele images that covers a field of view (FOV) of a wide image. For example, the initial homography information may be obtained by a scanning-tele camera of the image displaying apparatus configured to obtain a single wide image and a plurality of tele images that cover a FOV of the wide image. For another example, the initial homography information may be obtained by a camera module of the image displaying apparatus including a wide camera configured to capture a wide image and a scanning-tele camera configured to capture a plurality of tele images. A tele image used herein may refer to an image that, although having a narrow FOV, provides a greater optical zoom (e.g., at least three or more-fold optical zoom) than that a single wide image provides and thus provides a view at a farther distance. In this example, the initial homography information may further include translation and pose information of the wide camera configured to capture the wide image and the scanning-tele camera configured to capture the tele images and homography information between the wide image and the tele images, in addition to homography information between the tele images.

In operation 120, the image displaying apparatus may receive a user input of zooming a partial region of the wide image through a screen of the image displaying apparatus on which the wide image is displayed. The wide image may be an image (for example, a wide image 210 illustrated in FIG. 2) that is rendered by the image displaying apparatus according to an environment of a display device of the image displaying apparatus. Hereinafter, non-limiting examples of scaling an image based on a scale corresponding to a user input will be described in detail with reference to FIGS. 2 and 3.

In operation 130, the image displaying apparatus may stitch tele images corresponding to the partial region using the initial homography information, based on whether a zoom corresponding to the user input exceeds a maximum zoom level of the wide image.

For example, when the zoom corresponding to the user input exceeds the maximum zoom level of the wide image (for example, ×4 magnifications), the image displaying apparatus may switch an image displayed on the screen (for example, the wide image 210 of FIG. 2) to a tele image (for example, a tele image 230 of FIG. 2) to more naturally show a zoomed image without a disconnection (e.g., seamlessly).

In operation 130, the image displaying apparatus may determine whether the zoom corresponding to the user input exceeds the maximum zoom level of the wide image. When the zoom corresponding to the user input exceeds the maximum zoom level, the image displaying apparatus may determine whether the number of tele images corresponding to the partial region of the wide image is multiple. The image displaying apparatus may determine the number of tele images to be stitched for the partial region, and dynamically select a stitching rule from various stitching rules (for example, 2×1 stitching and 2×2 stitching) and use the selected stitching rule.

The image displaying apparatus may use, for example, a tiled pyramid method (a non-limiting example of which will be described hereinafter with reference to FIG. 3) to minimize memory usage for stitching. For example, the image displaying apparatus may determine whether the number of tele images corresponding to the partial region is multiple based on tiling information of tele images corresponding to the partial region. Although a non-limiting example will be described in detail later, the tiling information may include position coordinates and scale (or zoom level) values of tile images associated with the tele images corresponding to the partial region of the wide image.

In addition, the image displaying apparatus may rapidly cut along a boundary line using one of boundary line candidates preset within an overlapping region between aligned tele images, and then remove an artifact occurring by the boundary line candidate to complete the stitching. The artifact may be a seam that occurs in the overlapping region in a region from which aligned tele images are cut. Hereinafter, the artifact may be construed as being the seam, though examples are not limited thereto.

Although a non-limiting example will be described in detail later, a method of rapidly cutting along a boundary line using a boundary line candidate and removing an artifact occurring by the boundary line may be referred to as an easy-cut method.

For example, when the number of tele images corresponding to the partial region is multiple, the image displaying apparatus may stitch the multiple tele images corresponding to the partial region based on the initial homography information.

When the number of tele images corresponding to the partial region is multiple, the image displaying apparatus may scale the multiple tele images corresponding to the partial region according to a current scale corresponding to the user input, based on the initial homography information. The image displaying apparatus may then stitch the scaled tele images. In contrast, when the number of tele images corresponding to the partial region is not multiple (that is, when the number of tele images corresponding to the partial region is single), the image displaying apparatus may render the single tele image corresponding to the partial region and display a rendered image obtained by the rendering. Hereinafter, a non-limiting example method of stitching tele images by the image displaying apparatus will be described in detail with reference to FIG. 4.

In operation 140, the image displaying apparatus may render the tele images stitched in operation 130 and display a rendered image obtained by the rendering.

In an example, using a single wide image and a plurality of tele images for image zooming, the image displaying apparatus of one or more embodiments may stably estimate homography even in an environment in which there are limited available features in an image. In addition, by zooming in a partial region selected by a user through a user input, instead of an entire image, the image displaying apparatus of one or more embodiments may solve issues such as a rapid increase in memory usage and a decrease in processing speed that may occur due to pixel-wise operations.

Figure 2:
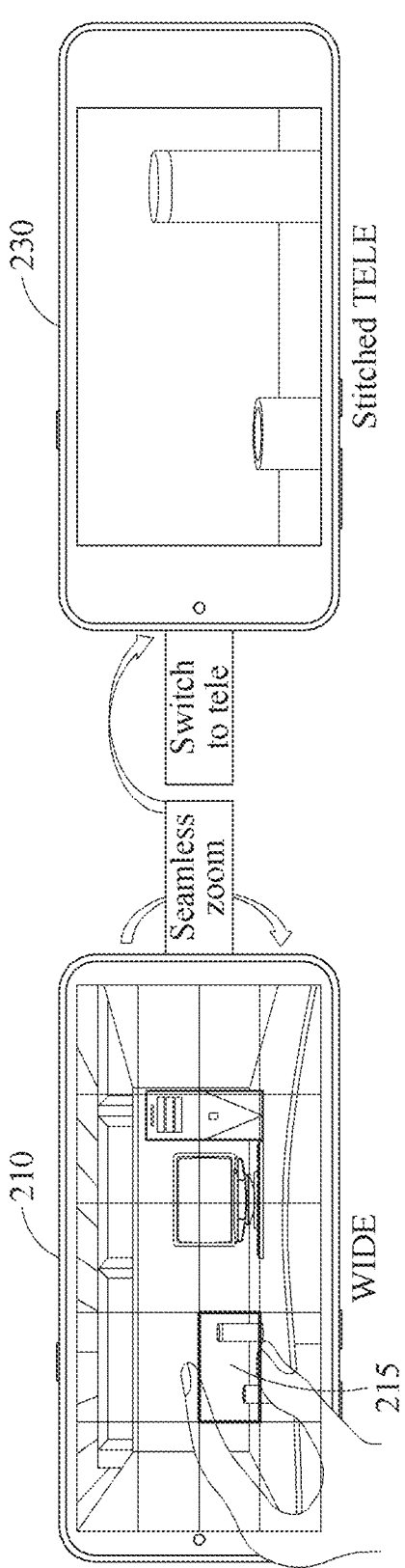
FIGS. 2 and 3 illustrate an example of a method of displaying an image scaled according to a scale corresponding to a user input.

FIG. 2 illustrates an example of a method of displaying an image scaled according to a scale corresponding to a user input. Referring to FIG. 2, scaling may be performed on a partial region 215 in an image according to a scale corresponding to a user input made with respect to a wide image 210 displayed on a screen of a display device of a user terminal of an image displaying apparatus of one or more embodiments. A partial region used herein may refer to a region that is selected by a user through a user input from a wide image.

For example, before a zoom corresponding to the user input exceeds a maximum zoom level (e.g., ×4 magnifications) of the wide image 210, the image displaying apparatus may render the wide image 210 according to the scale increasing in response to the user input and display a rendered image obtained by the rendering. When the zoom corresponding to the user input exceeds the maximum zoom level of the wide image 210, the image displaying apparatus may switch the wide image 210 to a tele image 230 such that an image zoomed by the user input is provided naturally without being disconnected.

In another example, when the zoom corresponding to the user input exceeds a maximum zoom level of the tele image 230, the image displaying apparatus may maintain the maximum zoom level of the tele image 230 or switch the tele image 230 to the wide image 210 before the zooming.

Figure 3:
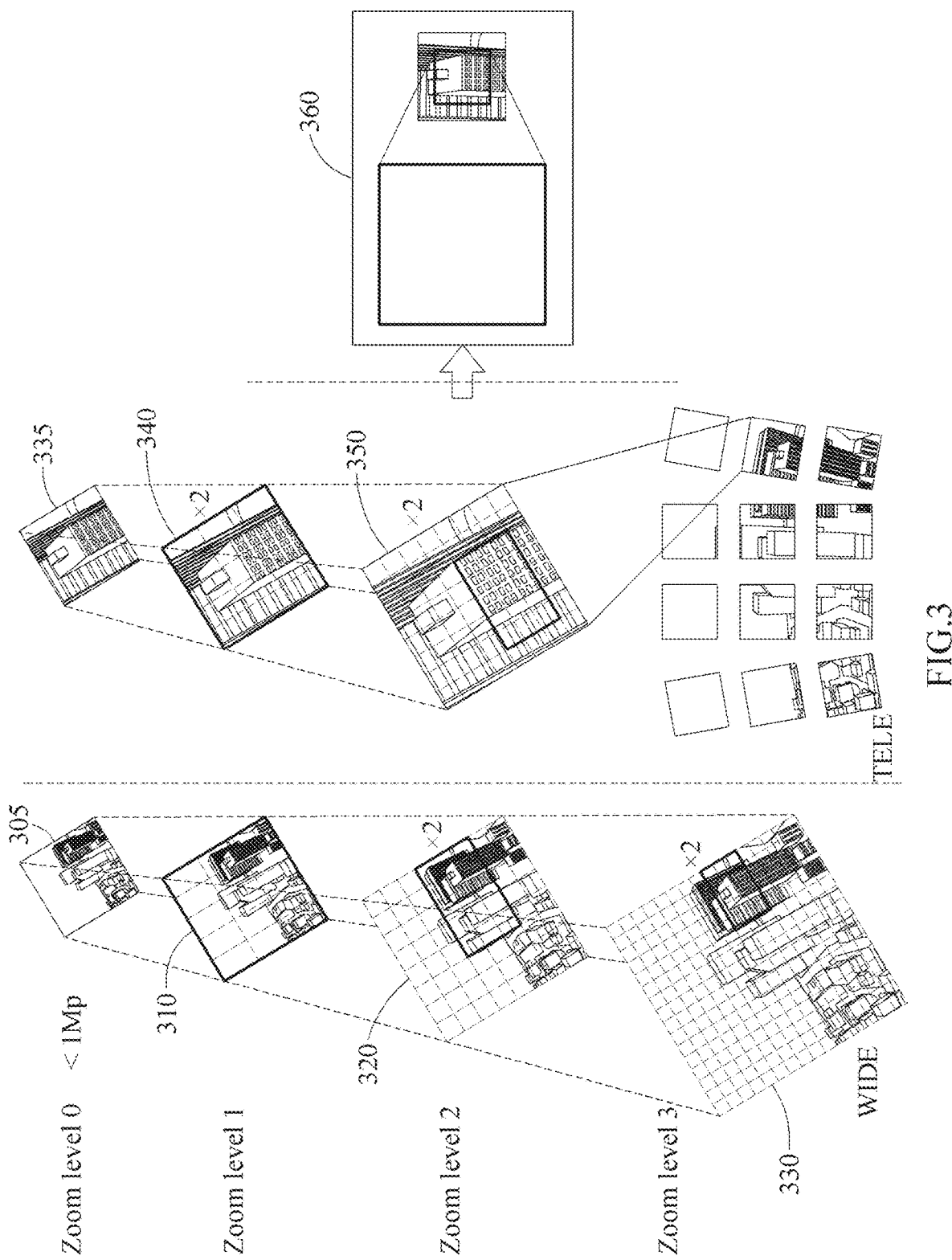

FIG. 3 illustrates an example of a method of displaying an image scaled according to a scale corresponding to a user input. On a left side of FIG. 3, illustrated are wide images 310, 320, and 330 scaled according to corresponding zoom levels. On a right side of FIG. 3, illustrated are tele images 340 and 350 scaled according to corresponding zoom levels.

The wide image 330 may have a resolution of 108 Mp (12 k×9 k). A tele image 335 may be an image selected from among 4×3 tele images obtained through scanning. The tele image 335 may have a resolution of 48 Mp (8 k×6 k).

The wide images 310, 320, and 330 and the tele images 340 and 350 may be represented by an image pyramid method that stores various scale information. In addition, the wide images 310, 320, and 330 and the tele images 340 and 350 may be represented by an image tiling method such that pyramid information for each scale is effectively loaded in a memory.

An image displaying apparatus of one or more embodiments may display a high-resolution image with a high level of performance by using the image pyramid method and the image tiling method. An image pyramid may include a basic image and a series of sequentially scaled images, and each image may have a resolution two times greater than that of a previous image. The image displaying apparatus may generate images by determining, for example, a level number, a tile size, and other attributes, and then generate a tiled image and/or an image level corresponding to each of the images. The image displaying apparatus may form the image pyramid by generating a series of images each with a resolution that is half a resolution of a previous image. The image displaying apparatus may use Gaussian filtering or Laplacian filtering, in addition to upsampling, as needed.

A tiled image or a tile that is based on the image tiling method may be an image obtained by dividing a single image into a plurality of small quadrangular regions. The size of a tiled image may be determined by an image. The size of a tiled image may be, for example, of a 512×512 pixel size, but examples of which are not limited thereto. When the unique size of a tiled image is not determined beforehand, a basic tile size (for example, a 1024×1024 pixel size) may be used to form the image pyramid.

The image displaying apparatus may display an image of zoom level 1 by zooming an image of zoom level 0 by a factor of two times. The image of zoom level 1 may have a resolution two times greater than that of the image of zoom level 0. When a tiled image corresponds to a portion of an entire image, a capacity of the tiled image may be less than or equal to a capacity of the entire image (tile image capacity entire image capacity). Thus, loading of the tiled image may be more rapidly performed than loading of the entire image.

Although a large image may be loaded only with the image tiling method, the speed of the loading may be relatively slow only with the image tiling method. Thus, to complement this, the image displaying apparatus of one or more embodiments may use images of different scales in addition to using the image tiling method.

Image scaling may refer to re-adjusting the size of an image, and a set of images obtained by scaling a basic image into different sizes may be referred to as an image pyramid. The size of a scale may be inversely proportional to the size of an image.

In an example, by combining the image tiling method and the image pyramid method, the image displaying apparatus of one or more embodiments may generate a tiled image to load a high-resolution image. That is, in an example, the image displaying apparatus may generate a tiled image for each pyramid image corresponding to each pyramid level. A tiled image may include, for example, tiling information including a position coordinate value (x, y) of a corresponding image and a scale value (or a zoom level) of the image.

For example, the image displaying apparatus may display an image 305 captured by a wide camera as the wide image 310 of zoom level 1 according to a display environment of the image displaying apparatus. The image 305 may have a resolution of less than 1 Mp, for example. The size of the wide image 310 of zoom level 1 may correspond to the size of the screen of the image displaying apparatus.

For example, when a user selects and zooms in a partial region of the wide image 310, the image displaying apparatus may sequentially display, on the screen, the wide image 320 zoomed to be zoom level 2 (×2) and the wide image 320 zoomed to be zoom level 3 (×2) in order to provide the user with a continuous zoom. In the wide image 320 and the wide image 330, box regions indicated in bold solid lines may be of the size of the screen of the image displaying apparatus.

When the user selects the partial region from the wide image 310, the image displaying apparatus may simultaneously perform various operations (for example, homography acquisition, easy-cut, and/or the like) to perform image stitching using information of tele image(s) associated with the selected partial region.

When a zoom corresponding to a user input made by the user exceeds a maximum zoom level of the wide image 310, the image displaying apparatus may switch a region corresponding to the wide image 330 to the tele image 335 to provide a high-quality zoomed image.

When the zoom corresponding to the user input continues, the image displaying apparatus may provide a greater zoom magnification by the tele image 340 zoomed from the tele image 335 by a factor of two times (×2 magnifications) and the tele image 350 zoomed from the tele image 340 by a factor of two times (×2 magnifications).

The image displaying apparatus may stitch tele images associated with the region selected by the user input and provide a rendered image, for example, an image 360.

In an example, the image displaying apparatus of one or more embodiments may perform the foregoing operations using image information associated with a partial region selected by a user, rather than using an entire image, and thus increase an image processing speed and enable real-time stitching while minimizing memory usage.

Figure 4:
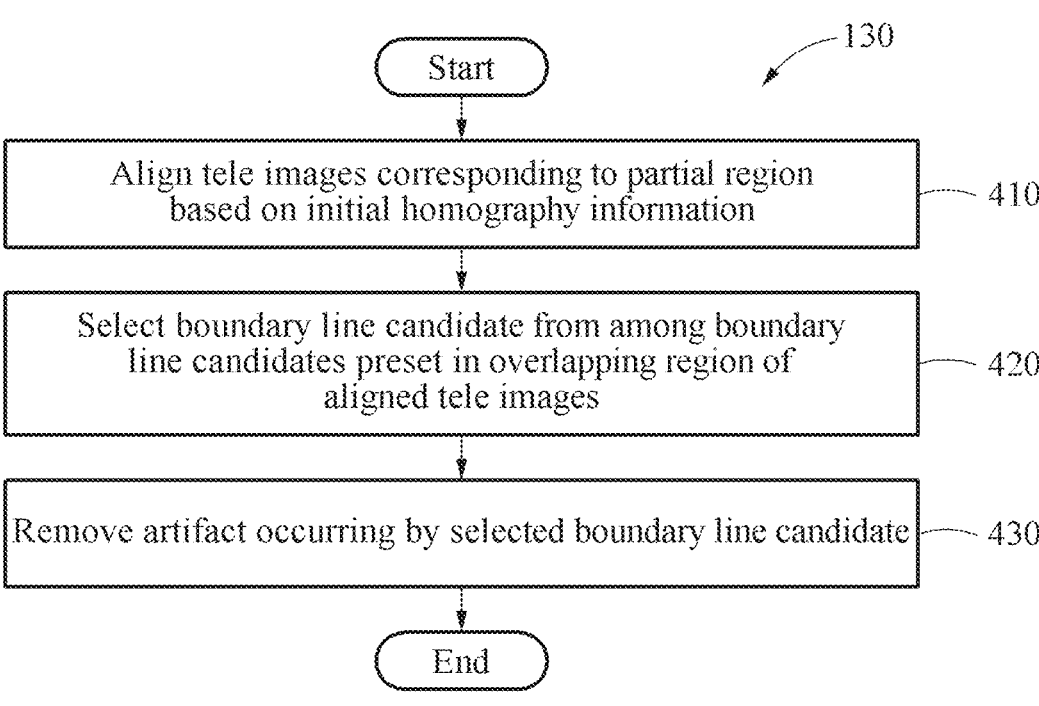
FIG. 4 illustrates an example of a method of stitching a plurality of tele images corresponding to a partial region.
Figure 5:
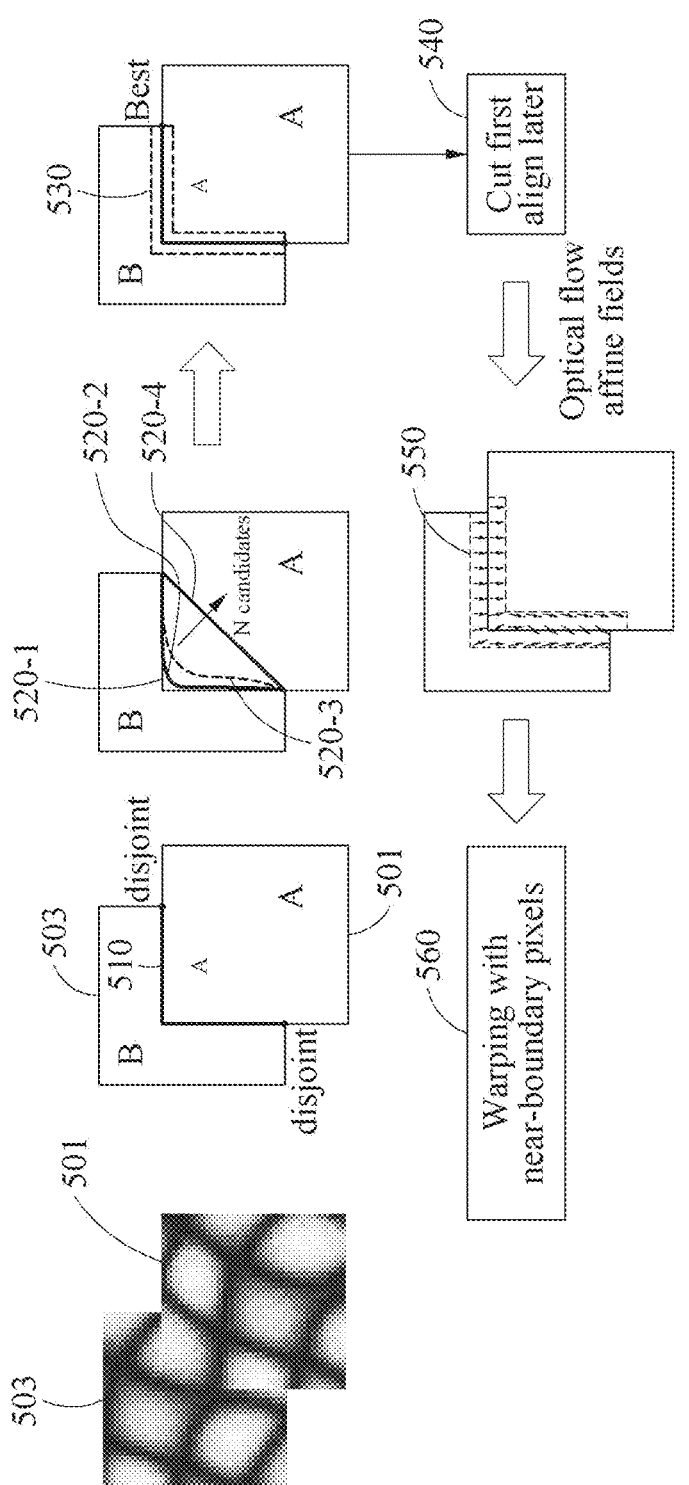
FIG. 5 illustrates an example of a method of stitching a plurality of tele images.

FIG. 4 illustrates an example of a method of stitching a plurality of tele images corresponding to a partial region. FIG. 5 illustrates an example of a method of stitching a plurality of tele images. The operations to be described hereinafter may be performed in sequential order, but not necessarily be performed in sequential order. For example, the order of the operations may change, and at least two of the operations may be performed in parallel.

Referring to FIGS. 4 and 5, an image displaying apparatus of one or more embodiments may stitch a plurality of tele images by performing operations 410 through 430.

In operation 410, the image displaying apparatus may align a plurality of tele images 501 and 503 corresponding to a partial region, based on initial homography information.

In operation 420, the image displaying apparatus may select one boundary line candidate from among boundary line candidates 520-1, 520-2, 520-3, and 520-4 that are set in an overlapping region between the aligned tele images 501 and 503. The image displaying apparatus may select the boundary line candidate 520-1 from among the preset boundary line candidates 520-1, 520-2, 520-3, and 520-4, based on a disjoint 510 between the tele images 501 and 503 aligned in operation 410. The preset boundary line candidates 520-1, 520-2, 520-3, and 520-4 may be determined by preset functions corresponding to, for example, a linear disjoint or a curved disjoint.

For example, the image displaying apparatus may correct information that indicates a boundary between regions by a boundary line candidate that is most suitable for images among paths or boundary line candidates that are based on a preset method (for example, a 2×1 or greater stitching method), using an occurring disjoint. For example, when the images change, the most suitable boundary line candidate may also change.

For example, the image displaying apparatus may determine a boundary line candidate (for example, the boundary line candidate 520-1) based on pixel values of a line corresponding to each of the boundary line candidates 520-1, 520-2, 520-3, and 520-4. For another example, the image displaying apparatus may determine a boundary line candidate (for example, the boundary line candidate 520-1) based on a result of accumulating differences of pixel values in a boundary region 530 adjacent to the boundary line candidate, for example, the boundary line candidate 520-1. The image displaying apparatus may determine, to be a boundary line along which tele images are cut, a boundary line candidate (for example, the boundary line candidate 520-1) that minimizes the difference of pixel values in the boundary region 530 adjacent to the boundary line candidate 520-1.

The image displaying apparatus of one or more embodiments may minimize information of the boundary region 530 and use the minimized information, and thus improve an image processing speed and reduce memory usage.

In operation 540, the image displaying apparatus may align pixels after cutting the aligned tele images 501 and 503 by the selected boundary line candidate 520-1.

In operation 430, the image displaying apparatus may remove an artifact occurring by the boundary line candidate 520-1 selected in operation 420. For example, the image displaying apparatus may determine a deformation field 550 of the boundary region 530 of the tele images 501 and 503 by an optical flow of the boundary region 530 including the selected boundary line candidate 520-1. The optical flow may indicate a movement pattern of an object in an image (for example, a tele image) and may include a distribution of orientations and distances in and by which pixels between a previous image frame (e.g., the tele image 501) and a subsequent image frame (e.g., the tele image 503) move. The optical flow may be used to determine an orientation in which an object in an image moves and a distance of the object moved, and to predict a movement of the object through an additional operation. Hereinafter, a non-limiting example method of removing an artifact by the image displaying apparatus will be described in detail with reference to FIG. 6.

In operation 560, the image displaying apparatus may warp pixels in the boundary region 530 based on the deformation field 550. The warping used herein may be construed as including color blending of pixels. When the image displaying apparatus warps or color-blends the pixels in the boundary region 530 based on the deformation field 550, the artifact may be removed as the color of the pixels in the boundary region 530 is smoothed.

Figure 6:
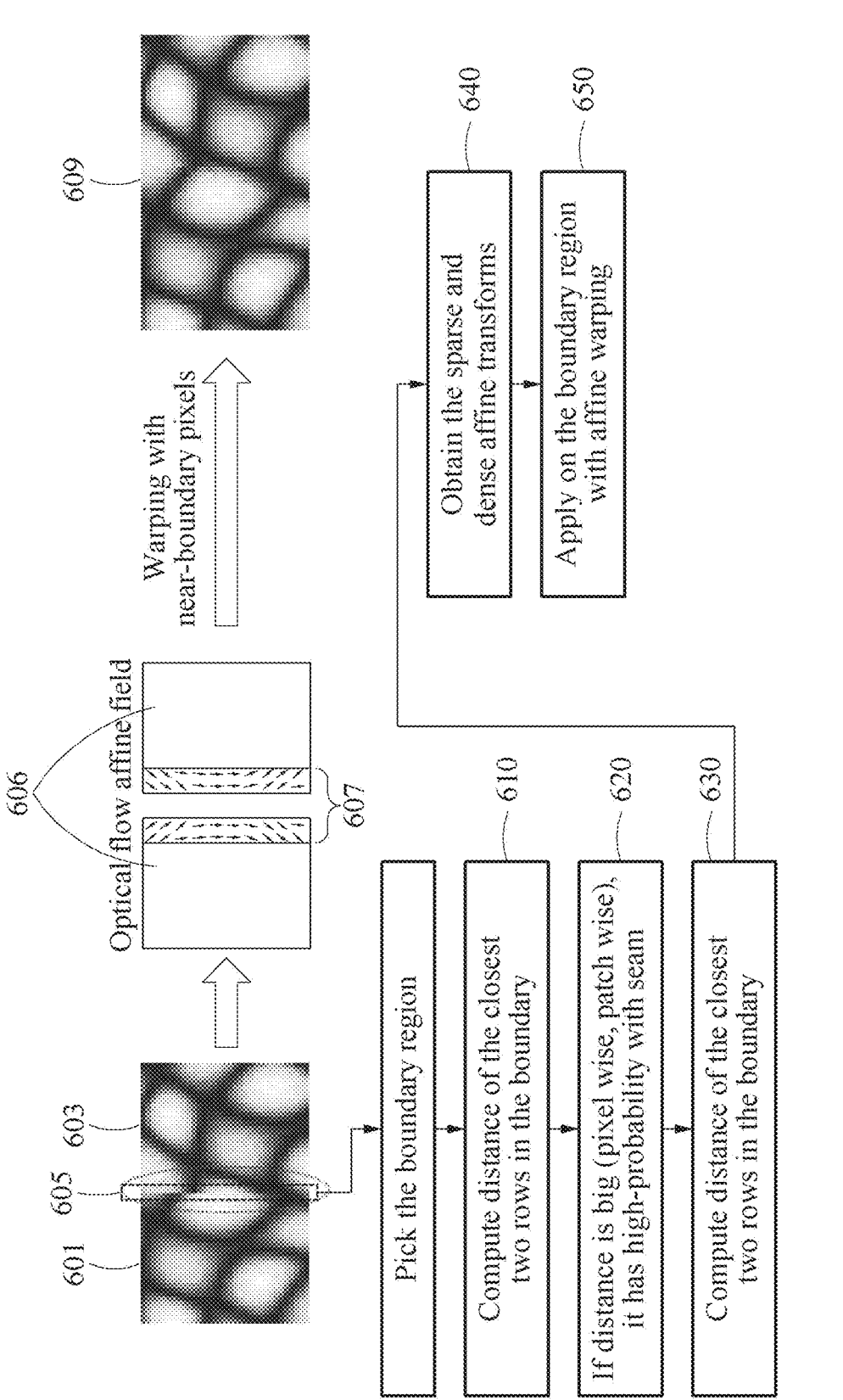
FIG. 6 illustrates an example of a method of removing an artifact occurring by a selected boundary line candidate.

FIG. 6 illustrates an example of a method of removing an artifact occurring by a selected boundary line candidate. The operations to be described hereinafter may be perform in sequential order, but not necessarily be performed in sequential order. For example, the order of the operations may change, and at least two of the operations may be performed in parallel.

An image displaying apparatus of one or more embodiments may remove an artifact occurring by a selected boundary line candidate, that is, a seam between images cut by the selected boundary line candidate, through operations 610 through 650 to be described hereinafter with reference to FIG. 6.

When the image displaying apparatus aligns two images, the image displaying apparatus may remove a seam by determining whether the seam is in a region between the aligned images.

In an example, the image displaying apparatus may select a boundary line candidate from among boundary line candidates preset in an overlapping region between aligned tele images 601 and 603, and detect a boundary region 605 adjacent to the selected boundary line candidate.

In operation 610, the image displaying apparatus may calculate a distance between two closest rows in the boundary region 605.

In operation 620, when the distance calculated in operation 610 is greater than a preset threshold value, the image displaying apparatus may determine a high probability of the presence of a seam in the boundary region 605 (or may determine the seam is present in the boundary region 605).

In operation 630, the image displaying apparatus may determine a deformation field 607 in the boundary region 605 using overlapping patches 606 around the boundary region 605, for example, using a coarse-to-fine optical flow-based method. The patches 606 may correspond to the aligned tele images 601 and 603, and indicate a set of images around a boundary between the tele images 601 and 603. The coarse-to-fine optical flow-based method may be a method of processing an image using a pyramid structure, applying an optical flow applied at a low resolution to an upper-level resolution to perform correction, and then estimating an optical flow at an original resolution.

In operation 640, the image displaying apparatus may obtain a sparse and dense affine transformation matrix. Herein, a sparse and dense affine transformation may be a method of estimating an affine transformation densely in all pixels using information obtained by coarsely estimating the affine transformation based on a feature point.

In operation 650, the image displaying apparatus may remove an artifact corresponding to a misalignment between the tele images 601 and 603 by performing warping by applying the affine transformation matrix obtained in operation 640 to the deformation field 607. The image displaying apparatus may display a resultant image 609 in which the artifact is removed from the aligned tele images 601 and 603.

In an example, the image displaying apparatus of one or more embodiments may perform image stitching using initial homography information. Thus, even when there is no feature to be matched in an image, the image displaying apparatus of one or more embodiments may remove an artifact in a boundary region that may occur due to a shake and/or autofocus of a camera, and the like.

Figure 7:
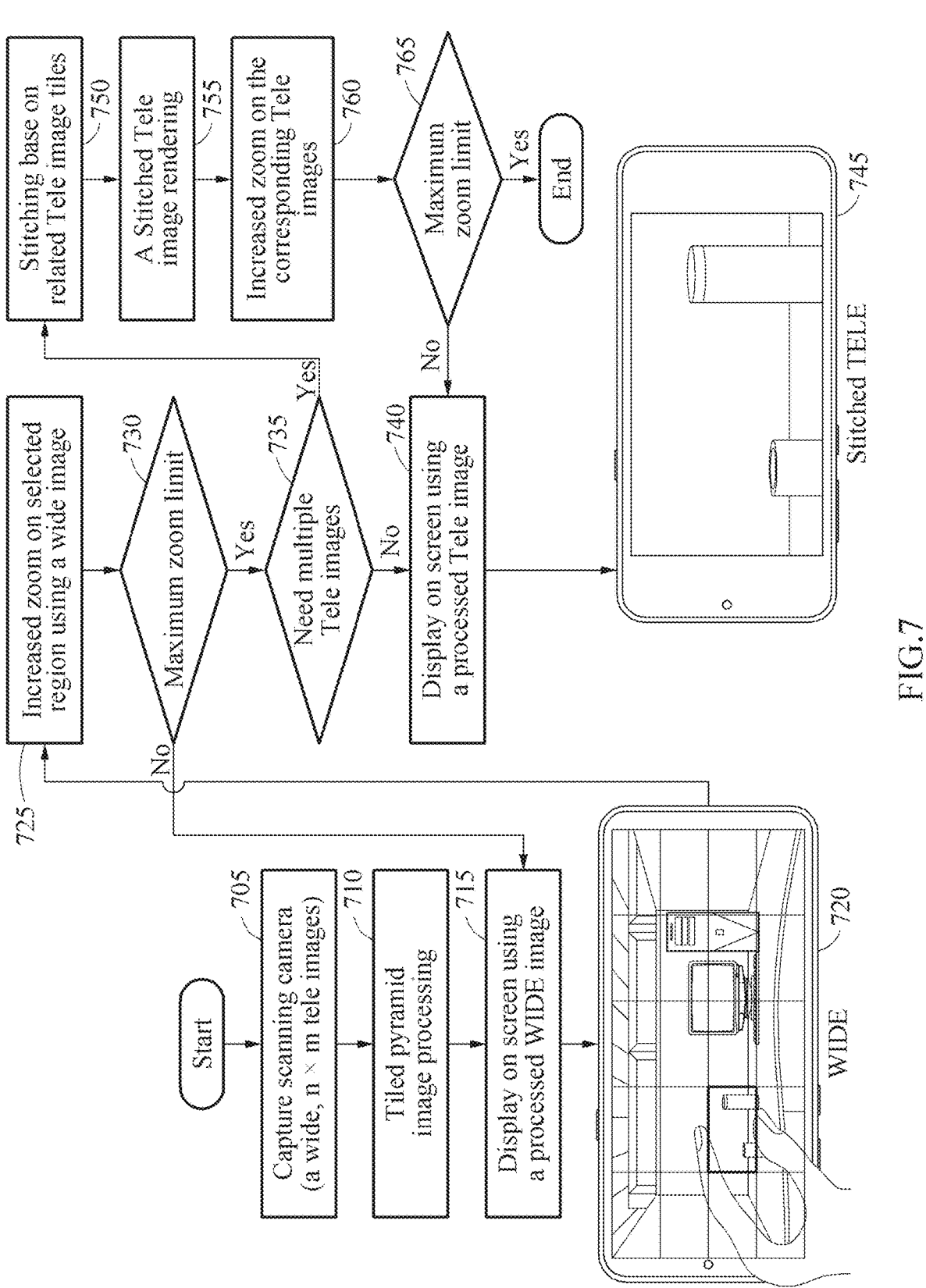
FIGS. 7 through 9 illustrates examples of an image displaying method.

FIG. 7 illustrates an example of an image displaying method. The operations to be described hereinafter may be perform in sequential order, but not necessarily be performed in sequential order. For example, the order of the operations may change, and at least two of the operations may be performed in parallel.

An image displaying apparatus of one or more embodiments may display an image by performing operations 705 through 765 to be described hereinafter with reference to FIG. 7.

In operation 705, the image displaying apparatus may capture a wide image and n×m tele images corresponding to the wide image by a scanning camera. The scanning camera may be, for example, a scanning-tele camera configured to capture a wide image and a plurality of tele images that cover a FOV of the wide image.

In operation 710, the image displaying apparatus may represent the images captured in operation 705 using a pyramid structure that represents images based on each scale, and perform tiled pyramid image processing through an image tiling method that may effectively load scale-based pyramid information in a memory and process the information.

In operation 715, the image displaying apparatus may display, on a screen, a processed wide image obtained through the tiled pyramid image processing performed in operation 710. The image displaying apparatus may render the wide image to be suitable for a display environment and display a rendered image obtained by the rendering.

In operation 720, the image displaying apparatus may receive a user input of selecting a partial region of the wide image displayed in operation 715 and of zooming the selected partial region.

In operation 725, the image displaying apparatus may increase a zoom on the partial region selected by the user input using the wide image.

In operation 730, the image displaying apparatus may determine whether the zoom increased in operation 725 exceeds a maximum zoom level of the wide image.

For example, when the zoom increased in operation 725 is not determined to exceed the maximum zoom level of the wide image in operation 730, the image displaying apparatus may display the wide image corresponding to a scale corresponding to the user input in operation 715.

Conversely, when the zoom increased in operation 725 is determined to exceed the maximum zoom level of the wide image in operation 730, the image displaying apparatus may switch the wide image to a tele image after determining a zoom level reaches an available level provided for the wide image.

In operation 735, the image displaying apparatus may determine what number of tele images the partial region selected by the user input corresponds to, for example, determine whether the number of tele images corresponding to the partial region selected by the user input is multiple.

In operation 740, when the number of tele images corresponding to the partial region is not determined to be multiple in operation 735 (e.g., is determined to be one), the image displaying apparatus may display, as shown in a screen 745, a tele image obtained by the tiled pyramid image processing performed in operation 710.

In operation 750, when the number of tele images corresponding to the partial region is determined to be multiple in operation 735, the image displaying apparatus may stitch the tele images corresponding to the partial region selected by the user input in operation 720. Herein, tele images corresponding to a partial region selected by a user may be construed as tele images corresponding to positions of coordinates of the partial region selected by the user in a corresponding wide image.

In operation 755, the image displaying apparatus may render the tele images stitched in operation 750 and display a rendered image obtained by the rendering.

In operation 760, when the user continues zooming the image displayed in operation 755, the image displaying apparatus may increase a zoom level of tele images corresponding to a user input made by the user.

In operation 765, the image displaying apparatus may determine whether a zoom increased by the user input exceeds a maximum zoom level of a corresponding tele image. When the zoom is not determined to exceed the maximum zoom level of the tele image in operation 765, the image displaying apparatus may display a tele image obtained through the tiled pyramid image processing performed in operation 740. The tele image displayed on the screen may be a tele image having a scale corresponding to the zoom increased in operation 760.

Conversely, when the zoom is determined to exceed the maximum zoom level of the tele image in operation 765, the image displaying apparatus may terminate operations.

Figure 8:
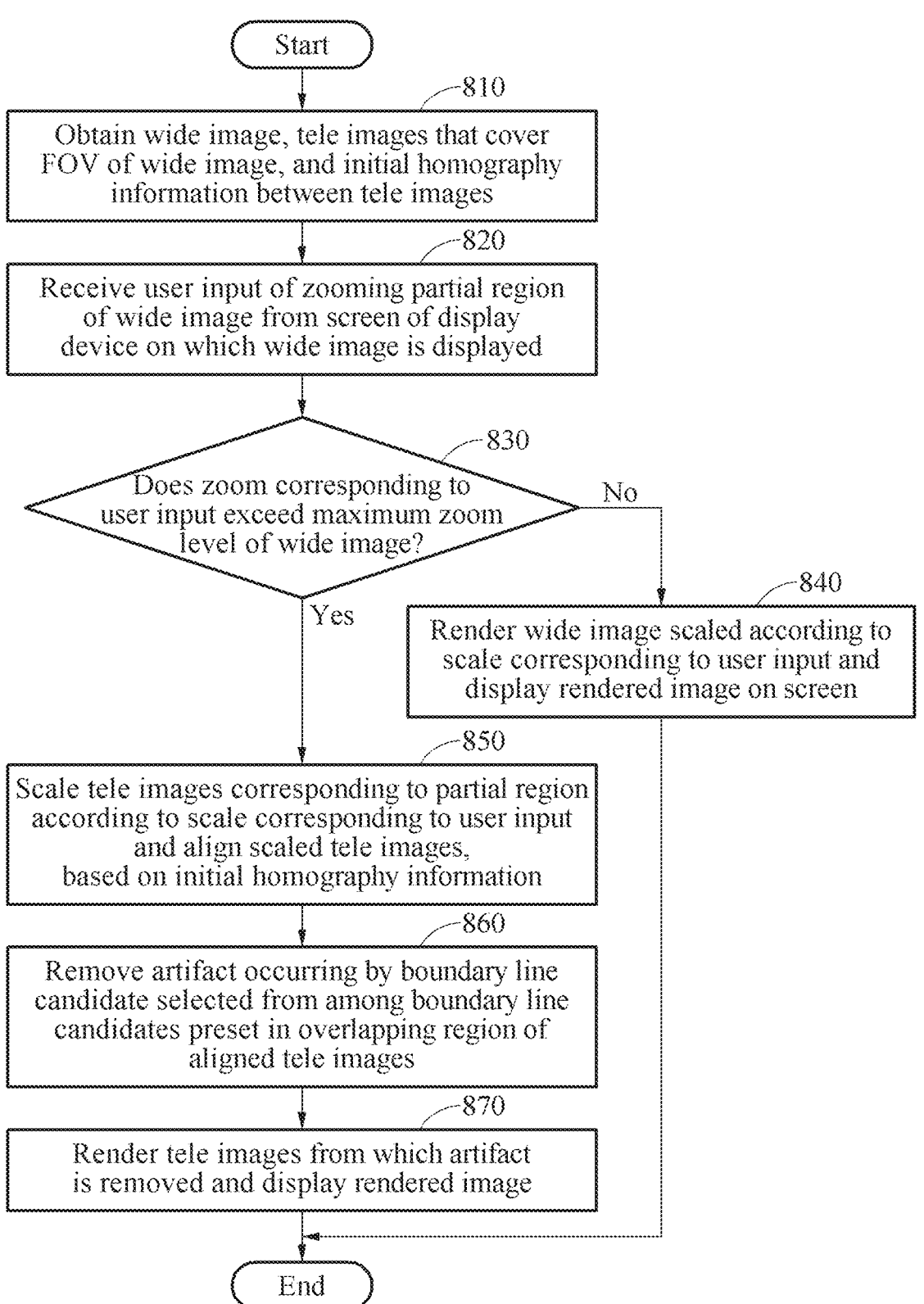

FIG. 8 illustrates another example of an image displaying method. The operations to be described hereinafter may be perform in sequential order, but not necessarily be performed in sequential order. For example, the order of the operations may change, and at least two of the operations may be performed in parallel. An image displaying apparatus of one or more embodiments may display an image by performing operations 810 through 870 to be described hereinafter with reference to FIG. 8.

In operation 810, the image displaying apparatus may obtain a wide image, a plurality of tele images that covers a FOV of the wide image, and initial homograph information between the tele images.

In operation 820, the image displaying apparatus may receive a user input of zooming a partial region of the wide image through a screen of a display device on which the wide image is displayed.

In operation 830, the image displaying apparatus may determine whether a zoom corresponding to the user input received in operation 820 exceeds a maximum zoom level of the wide image.

In operation 840, when the zoom corresponding to the user input is determined not to exceed the maximum zoom level of the wide image in operation 830, the image displaying apparatus may render the wide image scaled according to a scale corresponding to the user input received in operation 820 and display a rendered image obtained by the rendering on the screen.

In operation 850, when the zoom corresponding to the user input is determined to exceed the maximum zoom level of the wide image in operation 830, the image displaying apparatus may scale tele images corresponding to the partial region according to the scale corresponding to the user input received in operation 820 and align the scaled tele images, based on the initial homography information obtained in operation 810.

In operation 860, the image displaying apparatus may remove an artifact occurring by a boundary line candidate selected from among boundary line candidates preset in an overlapping region between the tele images aligned in operation 850.

In operation 870, the image displaying apparatus may render tele images from which the artifact is removed in operation 860 and display a rendered image obtained by the rendering.

Figure 9:
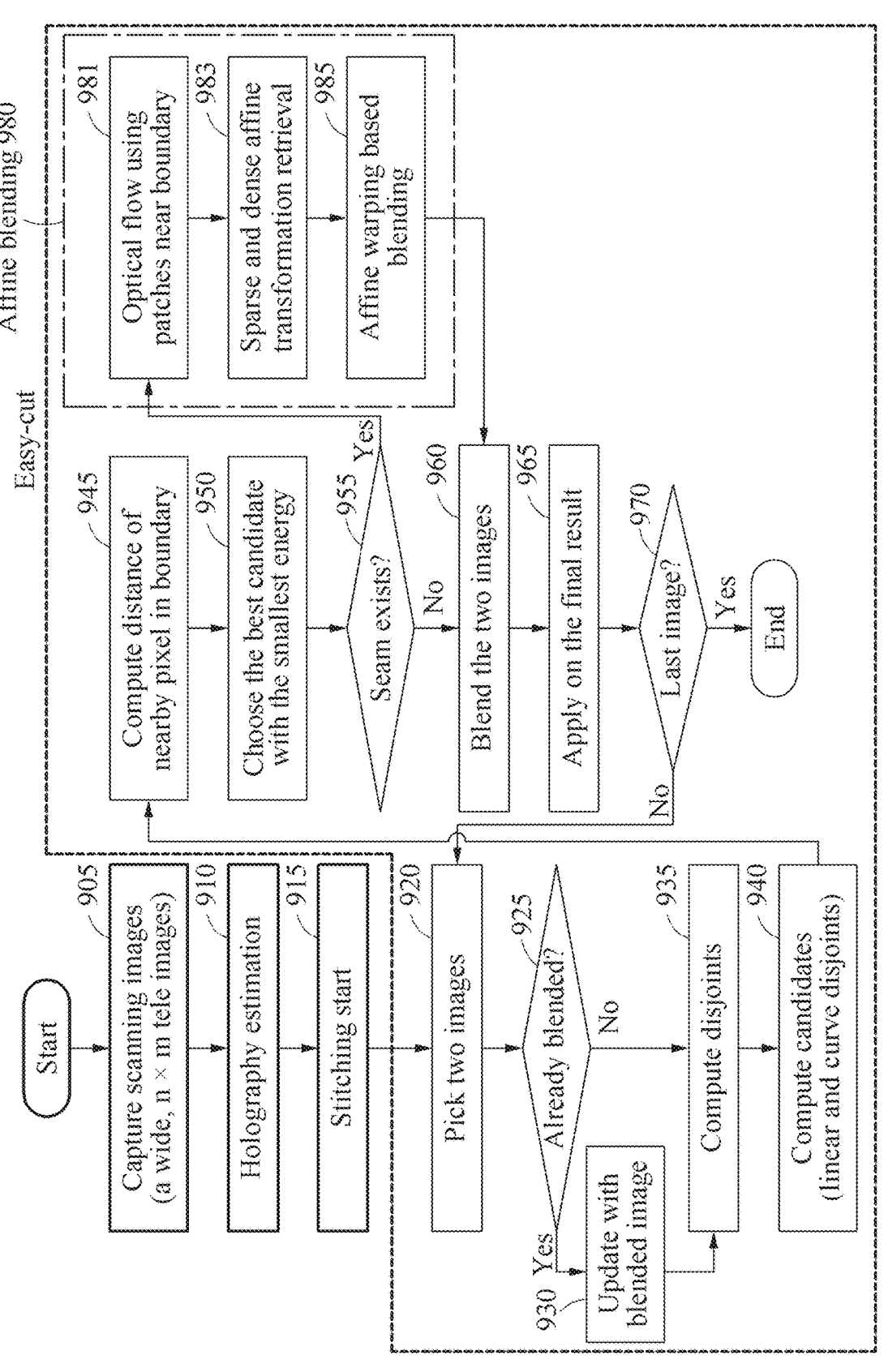

FIG. 9 illustrates still another example of an image displaying method. The operations to be described hereinafter may be perform in sequential order, but not necessarily be performed in sequential order. For example, the order of the operations may change, and at least two of the operations may be performed in parallel.

An image displaying apparatus of one or more embodiments may display an image by performing operations 905 through 980 to be described hereinafter with reference to FIG. 9. Operations 920 through 980 to be described hereinafter with reference to FIG. 9 may correspond to an easy-cut process for stitching tele images. The easy-cut process may cut fast along a boundary line between aligned tele images and blend an artifact occurring by the boundary line to minimize the artifact and allow stitching to be performed rapidly. In addition, operation 980 may correspond to affine blending. Affine blending may be a process of removing an artifact through an affine transformation and pixel blending.

In operation 905, the image displaying apparatus may capture scanned images, for example, a wide image and n×m tele images, by a scanning camera.

In operation 910, the image displaying apparatus may estimate homography information corresponding to the scanned images captured in operation 905. The homography information to be estimated may include, for example, translation and pose information of a wide camera configured to capture a wide image and a scanning-tele camera configured to capture a plurality of tele images that cover a FOV of the wide image, and homography information between the tele images. According to examples, in operation 905, when a camera that captures the scanned images is the scanning-tele camera, the image displaying apparatus may not directly estimate the homography information, but obtain the homography information from the scanning-tele camera.

In operation 915, the image displaying apparatus may start image stitching based on the homography information estimated or obtained in operation 910.

In operation 920, the image displaying apparatus may select two images.

In operation 925, the image displaying apparatus may determine whether the images selected in operation 920 are already blended. For example, when the images selected in operation 920 are not yet blended, the image displaying apparatus may calculate a disjoint between the images selected in operation 920.

Conversely, when the images selected in operation 920 are blended, the image displaying apparatus may update the blended images in operation 930. The updated images may include an image stitched to an existing image without an artifact such as a seam therebetween, that is, an image stitched until a current time. The image displaying apparatus may verify whether there is a seam in an image to be additionally added, remove the seam when its presence is verified, and update a currently stitched image. The image displaying apparatus may perform the foregoing operations until all the tele images are stitched.

In operation 935, the image displaying apparatus may calculate a disjoint between the images updated in operation 930.

In operation 940, the image displaying apparatus may calculate boundary line candidates based on the disjoint calculated in operation 935. The image displaying apparatus may calculate the boundary line candidates by a linear disjoint and/or a curved disjoint, for example.

In operation 945, the image displaying apparatus may calculate a distance between neighboring pixels in a boundary region by the boundary line candidates calculated in operation 940. For example, the distance between the neighboring pixels in the boundary region may correspond to a result of accumulating differences of pixel values in the boundary region.

In operation 950, the image displaying apparatus may select, as a boundary line along which cutting is made, an optimal boundary line candidate having a minimum energy based on the distance calculated in operation 945 from among the boundary line candidates calculated in operation 940.

In operation 955, the image displaying apparatus may determine whether a seam is present in the boundary region by the boundary line candidate selected in operation 950. For example, when the seam is determined to be present in operation 955, the image displaying apparatus may perform affine blending in operation 980, and then blend two images obtained through affine blending in operation 960.

In operation 981 of operation 980 for affine blending, the image displaying apparatus may verify an optical flow in the boundary region using patches around the boundary region. The image displaying apparatus may determine a deformation field of the boundary region of a plurality of tele images by the optical flow in the boundary region. In operation 983 of operation 980 for affine blending, the image displaying apparatus may retrieve a function or matrix for a sparse and dense affine transformation. In operation 985 of operation 980 for affine transformation, the image displaying apparatus may perform affine warping by applying the affine transformation function or matrix retrieved in operation 983 to the deformation field determined in operation 981 and blending the color of pixels in the boundary region.

In operation 960, when the seam is determined not to be present in operation 955, the image displaying apparatus may blend the images selected in operation 920 or the images updated in operation 930.

In operation 965, the image displaying apparatus may apply a result of the blending in operation 960 immediately to an image obtained by the stitching performed until a current point in time.

In operation 970, the image displaying apparatus may determine whether a corresponding image is a last image. When the image is determined not to be the last image in operation 970, the image displaying apparatus may select two new images in operation 920.

When the image is determined to be the last image, the image displaying apparatus may terminate operations.

Figure 10:
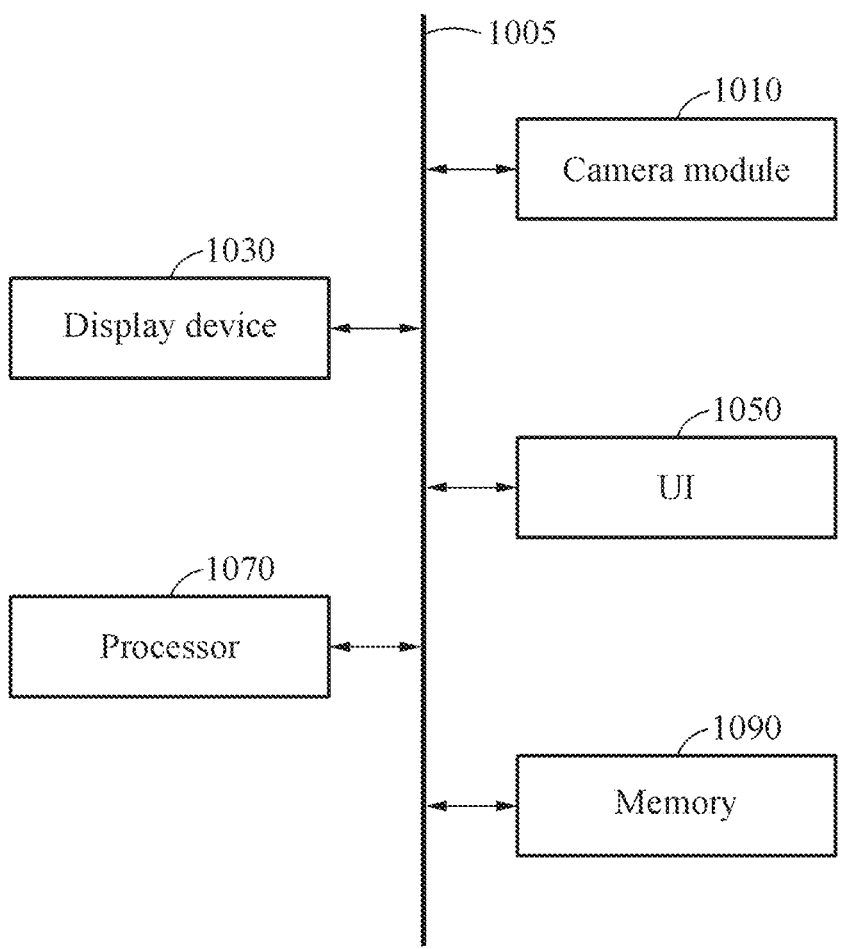
FIG. 10 illustrates an example of an image displaying apparatus.

FIG. 10 illustrates an example of an image displaying apparatus. Referring to FIG. 10, an image displaying apparatus 1000 may include a camera module 1010, a display device 1030, a user interface (UI) 1050, a processor 1070, and a memory 1090. The camera module 1010, the display device 1030, the UI 1050, the processor 1070, and the memory 1090 may communicate with one another through a communication bus 1005. The image displaying apparatus 1000 may be any of the image displaying apparatuses described above with reference to FIGS. 1-9, and may be or include any of a smartphone, a personal computer (PC), a laptop computer, a tablet PC, a television (TV), a smart home appliance, an intelligent vehicle, a kiosk, and a wearable device, as non-limiting examples.

The camera module 1010 may obtain a wide image, a plurality of tele images that covers a FOV of the wide image, and initial homography information between the tele images.

The display device 1030 may display at least one of the wide image and the tele images. The display device 1030 may display an image rendered by the processor 1070, that is, tele images stitched by the processor 1070. The display device 1030 may be, for example, a touch display or a flexible touch display.

The UI 1050 may receive a user input of zooming a partial region of the wide image from a screen of the display device 1030 on which the wide image is displayed.

The processor 1070 may stitch tele images corresponding to the partial region using the initial homography information based on whether a zoom corresponding to the user input received through the UI 1050 exceeds a maximum zoom level of the wide image. The processor 1070 may render the stitched tele images and display, on the screen of the display device 1030, a rendered image obtained by the rendering.

The processor 1070 may also perform at least one of the methods and operations described above with reference to FIGS. 1 through 9 and perform an algorithm corresponding to the at least one method and operation. The processor 1070 may be a hardware-implemented image displaying device having a physically structured circuit to execute desired operations. For example, the desired operations may include codes or instructions included in a program. For example, the hardware-implemented image displaying device may include at least one of a microprocessor, a central processing unit (CPU), a processor core, a multi-core processor, a multiprocessor, an application-specific integrated circuit (ASIC), a field-programmable gate array (FPGA), a graphics processing unit (GPU), and a neural processing unit (NPU).

The processor 1070 may execute the program and control the image displaying apparatus 1000. A code of the program executed by the processor 1070 may be stored in the memory 1090.

The memory 1090 may store the initial homography information obtained by the camera module 1010. The memory 1090 may store position coordinates corresponding to the user input received through the UI 1050. In addition, the memory 1090 may store the tele images stitched by the processor 1070 and/or a result of rendering the stitched tele images by the processor 1070.

The memory 1090 may store various sets of information generated during processes or operations performed by the processor 1070. The memory 1090 may also store various sets of data, programs, and the like. The memory 1090 may include a volatile or nonvolatile memory. The memory 1090 may include a large-capacity storage medium such as a hard disk, and store various sets of data therein.

The image displaying apparatuses, camera modules, display devices, UIs, processors, memories, communication buses, image displaying apparatus 1000, camera module 1010, display device 1030, UI 1050, processor 1070, memory 1090, communication bus 1005, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of displaying an image, comprising:
obtaining initial homography information between a plurality of tele images that covers a field of view (FOV) of a wide image;
determining whether a user input of zooming a partial region of the wide image from a screen on which the wide image is displayed exceeds a maximum zoom level;
in response to the zoom exceeding the maximum zoom level, determining whether a number of the tele images corresponding to the partial region is more than one tele image;
in response to the number of the tele images corresponding to the partial region being more than one tele image, stitching tele images corresponding to the partial region using the initial homography information; and
rendering the stitched tele images and displaying an image obtained by the rendering on the screen,
wherein the stitching comprises aligning the multiple tele images corresponding to the partial region based on the initial homography information and removing an artifact occurring in a boundary region of an overlapping region among the tele images by:
determining a deformation field of the boundary region of the tele images by an optical flow of the boundary region; and
warping pixels in the boundary region based on the deformation field.

2. The method of claim 1, wherein the stitching in response to the number of the tele images corresponding to the partial region being more than one tele image comprises:
selecting a boundary line candidate from among a plurality of boundary line candidates preset in the overlapping region of the aligned tele images.

3. The method of claim 2, wherein the selecting of the boundary line candidate comprises:
determining the boundary line candidate based on pixel values of pixels of a line corresponding to each of the boundary line candidates.

4. The method of claim 2, wherein the selecting of the boundary line candidate comprises:
determining the boundary line candidate based on a result of accumulating differences of pixel values of pixels in a boundary region adjacent to the boundary line candidate among the boundary line candidates.

5. The method of claim 1, wherein the stitching in response to the number of the tele images corresponding to the partial region being multiple comprises:
scaling the multiple tele images corresponding to the partial region according to a current scale corresponding to the user input, based on the initial homography information; and
stitching the scaled tele images.

6. The method of claim 1, wherein the determining whether the number of the tele images corresponding to the partial region is multiple comprises:
determining whether the number of the tele images corresponding to the partial region is multiple based on tiling information of the tele images corresponding to the partial region.

7. The method of claim 1, further comprising:
in response to the number of the tele images corresponding to the partial region not being more than one tele image, rendering a tele image corresponding to the partial region and displaying an image obtained by the rendering.

8. The method of claim 1, further comprising:
rendering the wide image according to an environment of a display device and displaying an image obtained by the rendering on the screen.

9. A method of displaying an image, comprising:
obtaining a wide image, a plurality of tele images that cover a field of view (FOV) of the wide image, and initial homography information between the tele images;
receiving a user input of zooming a partial region of the wide image from a screen of a display on which the wide image is displayed;
in response to a zoom corresponding to the user input not exceeding a maximum zoom level of the wide image, rending a wide image scaled according to a scale corresponding to the user input and displaying an image obtained by the rendering on the screen;
in response to the zoom corresponding to the user input exceeding the maximum zoom level of the wide image, scaling tele images corresponding to the partial region according to the scale corresponding to the user input and aligning the scaled tele images, based on the initial homography information;
in response to the number of the tele images corresponding to the partial region being more than one tele image, stitching tele images corresponding to the partial region using the initial homography information; and
removing an artifact occurring by a boundary line candidate selected from among a plurality of boundary line candidates preset in an overlapping region of the aligned tele images; and
rendering tele image from which the artifact is removed and displaying an image obtained by the rendering on the screen,
wherein the stitching comprises aligning the multiple tele images corresponding to the partial region based on the initial homography information and
wherein the removing of the artifact comprises:
determining a deformation field of the boundary region of the tele images by an optical flow of the boundary region; and
warping pixels in the boundary region based on the deformation field.

10. A non-transitory computer-readable storage medium storing instructions that, when executed by a processor, cause the processor to perform the method of claim 1.

11. An apparatus for displaying an image, comprising:
a camera module configured to obtain a wide image, a plurality of tele images that covers a field of view (FOV) of the wide image, and initial homography information between the tele images;
a display device configured to display at least one of the wide image and the tele images;

a user interface (UI) configured to receive a user input of zooming a partial region of the wide image from a screen of the display device on which the wide image is displayed; and a processor configured to:

determine whether a zoom corresponding to the user input exceeds a maximum zoom level;

in response to the zoom exceeding the maximum zoom level, determine whether a number of the tele images corresponding to the partial region is more than one tele image;

in response to the number of the tele images corresponding to the partial region being more than one tele image, stitch tele images corresponding to the partial region using the initial homography information; and render the stitched tele images and display an image obtained by the rendering, wherein stitching comprises aligning the multiple tele images corresponding to the partial region based on the initial homography information and removing an artifact occurring in a boundary region of an overlapping region among the tele images by:

determining a deformation field of a boundary region of the tele images by an optical flow of the boundary region, and warping pixels in the boundary region based on the deformation field.

12. The apparatus of claim 11, wherein the processor is configured to:

select a boundary line candidate from among a plurality of boundary line candidates preset in the overlapping region of the aligned tele images.

13. The apparatus of claim 12, wherein the processor is configured to:

determine the boundary line candidate based on pixel values of pixels of a line corresponding to each of the boundary line candidates.

14. The apparatus of claim 12, wherein the processor is configured to:

determine the boundary line candidate based on a result of accumulating differences of pixel values of pixels in a boundary region adjacent to the boundary line candidate among the boundary line candidates.

15. The apparatus of claim 11, wherein the processor is configured to:

scale the multiple tele images corresponding to the partial region according to a current scale corresponding to the user input, based on the initial homography information, and stitch the scaled tele images.

16. The apparatus of claim 11, wherein the processor is configured to:

determine whether the number of the tele images corresponding to the partial region is more than one tele image based on tiling information of the tele images corresponding to the partial region.

* * * * *